Oct. 22, 1929.                A. L. HATCHER                1,733,060
                              CURTAIN HANGER
                            Filed March 6, 1928
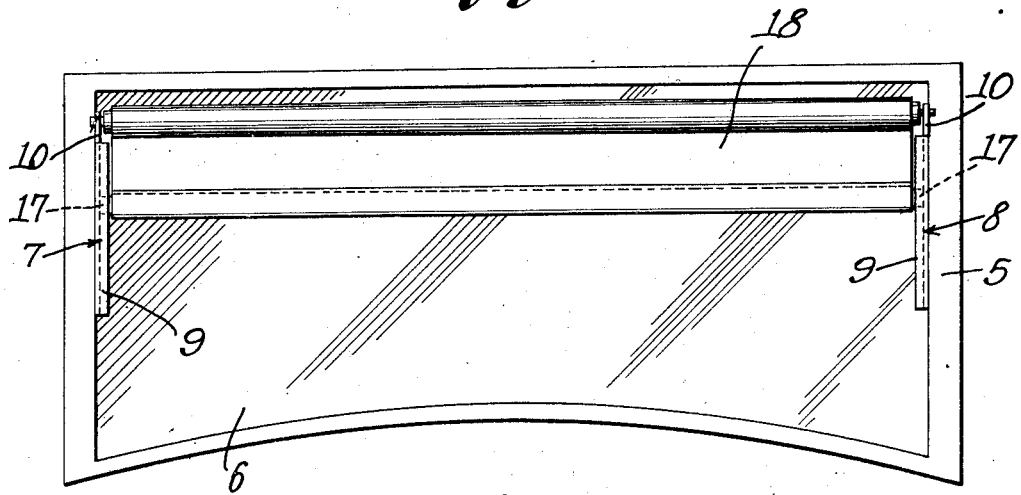
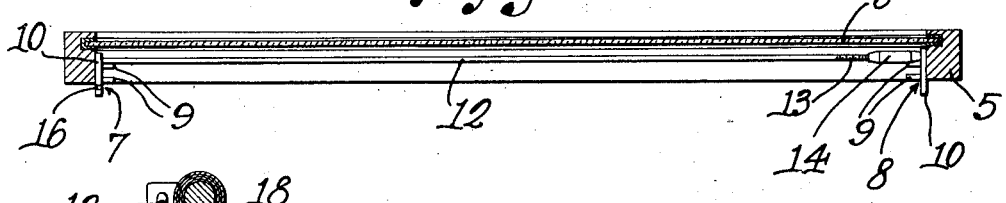
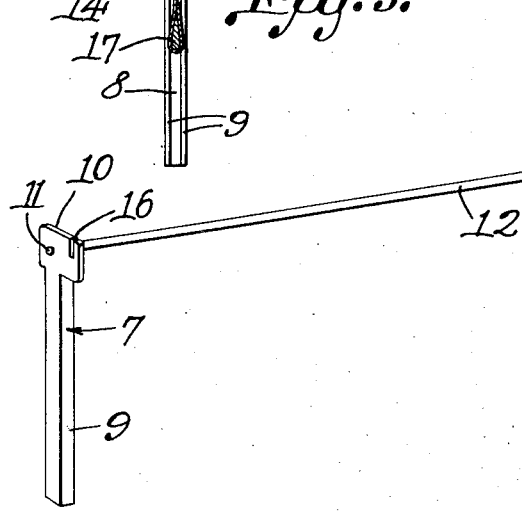
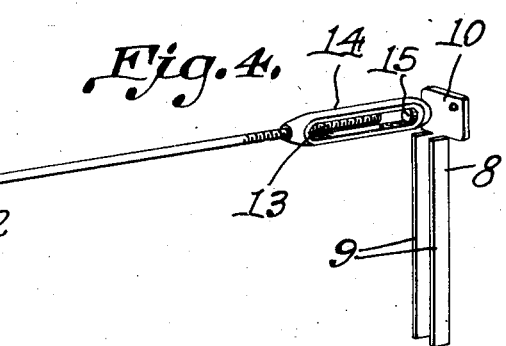
A. L. Hatcher
        Inventor
By C. A. Snow & Co.
        Attorneys Patented Oct. 22, 1929

1,733,060

UNITED STATES PATENT OFFICE

ABRAHAM L. HATCHER, OF AMARILLO, TEXAS

CURTAIN HANGER

Application filed March 6, 1928. Serial No. 259,467.

This invention relates to a shade and shade support, the construction of the shade and support being especially designed for use in connection with motor vehicles and particularly the windshields thereof.

The primary object of the invention is to provide a shade which may be readily and easily secured within the frame in which the usual windshield of a motor vehicle is supported, so that the shade may be moved to shield the eyes of the driver of the vehicle against blinding sun rays.

An important object of the invention is to provide a hanger so constructed that the usual shade stick may operate therein and be held against movement to insure against the curtain flapping against the windshield.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a rear elevational view of a windshield showing a shade supported adjacent thereto.

Figure 2 is a horizontal sectional view through the windshield, the shade being removed.

Figure 3 is a vertical sectional view through the shade and roller.

Figure 4 is a perspective view of the shade hanger.

Referring to the drawing in detail, the reference character 5 designates the usual windshield frame in which the windshield is positioned, the windshield in the present showing being indicated by the reference character 6.

The hanger forming an important feature of the invention, embodies end sections 7 and 8 respectively, each of which is constructed of a length of sheet metal cut at points adjacent to the upper end thereof, the longitudinal edges of each member being bent inwardly as at 9 defining parallel spaced flanges 9.

At the upper end of each hanger is a substantially wide portion 10 designed to contact with the frame 5 in such a way as to insure against damage to the frame when the hangers are positioned.

The section 7 of the hanger is formed with a threaded opening to receive the threaded extremity 11 of the rod 12 which is formed with a threaded extremity 13 adapted to pass through a threaded opening in one end of the turn buckle 14, the opposite end of the turnbuckle having a swivel connection with the member 10, at 15, so that the turn-buckle may be readily operated.

As shown, a notch 16 is formed in the upper portion 10 of one of the sections, while the opposite portion 10 of the cooperating section is provided with an opening, the notch and opening being designed to receive the pintles of the window shade roller, as clearly shown by Figure 1.

The usual shade stick is shown at 17 and has its ends extended beyond the side edges of the shade proper 18, with the result that the shade stick may be held against flapping on the windshield.

From the foregoing it will be obvious that a motor vehicle equipped with a windshield attachment of this character may be driven into the sun rays without danger of the driver being blinded.

It will also be seen that the shade may be lowered to various positions to insure a true line of vision unobstructed by light rays.

I claim:

A curtain fixture including bracket members, each bracket member comprising a length of sheet metal, parallel flanges formed along the longitudinal edges of the length of sheet metal and extending in the same direction, a substantially wide portion at the upper end of each bracket member, the wide portion being disposed at right angles to the sides of the flanges and the edges of the wide portion being disposed appreciable distances beyond the flanges to provide a flat window frame engaging surface, said wide portion having an aperture formed therein adapted to support one end of a shade roller, and a member arranged between the bracket members for exerting pressure on the bracket members to secure the bracket members against a window frame.

In testimony that I claim the foregoing as my own, I have hereto affixed my signature.

ABRAHAM L. HATCHER.